(12) United States Patent
Park et al.

(10) Patent No.: US 9,274,639 B2
(45) Date of Patent: Mar. 1, 2016

(54) DISPLAY DEVICE HAVING A TOUCH PANEL WITH AUXILIARY LINES SUPPLYING SUPPLEMENTAL AUXILIARY DRIVE SIGNALS

(71) Applicant: LG Display Co., Ltd., Seoul (KR)

(72) Inventors: Yong-Chan Park, Seoul (KR); Ju-Han Kim, Bucheon-si (KR); Sung-Chul Kim, Goyang-si (KR); Hoon-Bae Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/710,341

(22) Filed: May 12, 2015

(65) Prior Publication Data

US 2016/0026312 A1 Jan. 28, 2016

(30) Foreign Application Priority Data

Jul. 24, 2014 (KR) .................. 10-2014-0093989

(51) Int. Cl.
*G06F 3/045* (2006.01)
*G06F 3/044* (2006.01)
*G06F 3/041* (2006.01)

(52) U.S. Cl.
CPC .............. *G06F 3/0412* (2013.01); *G06F 3/044* (2013.01); *G06F 3/0416* (2013.01)

(58) Field of Classification Search
CPC ............................ G06F 3/044; G09G 3/3677
USPC ........................................ 345/174; 178/18.06
See application file for complete search history.

(56) References Cited

U.S. PATENT DOCUMENTS

| 2006/0201931 | A1  |  9/2006 | Lee et al. |
| 2010/0045635 | A1* |  2/2010 | Soo ............................... 345/173 |
| 2010/0253638 | A1* | 10/2010 | Yousefpor et al. ............ 345/173 |
| 2011/0018560 | A1* |  1/2011 | Kurashima .................... 324/679 |
| 2011/0193820 | A1* |  8/2011 | Chen et al. ..................... 345/173 |
| 2011/0267293 | A1* | 11/2011 | Noguchi et al. ............... 345/173 |
| 2013/0050146 | A1* |  2/2013 | Saitoh et al. ................... 345/173 |
| 2013/0127752 | A1* |  5/2013 | Takeuchi et al. .............. 345/173 |
| 2013/0265244 | A1* | 10/2013 | Kim et al. ...................... 345/173 |
| 2013/0285971 | A1* | 10/2013 | Elias et al. ..................... 345/174 |
| 2013/0285972 | A1* | 10/2013 | Elias et al. ..................... 345/174 |
| 2013/0342478 | A1  | 12/2013 | Bae et al. |

FOREIGN PATENT DOCUMENTS

EP  1821175 A1  8/2007
EP  2503435 A2  9/2012

OTHER PUBLICATIONS

European Extended Search Report, European Application No. 15178051.7, Dec. 3, 2015, 9 pages.

* cited by examiner

*Primary Examiner* — Adam J Snyder
(74) *Attorney, Agent, or Firm* — Fenwick & West LLP

(57) ABSTRACT

A touch display device comprises a controller to generate a touch sync signal for controlling timing of a touch sensing period and a display period. A touch panel has a plurality of touch electrodes in a display area of the touch display device. The touch panel generates touch sensing signals indicating whether or not a touch occurs during the touch sensing period. A gate driver supplies gate pulses to gate lines of the touch panel during the display period and supplies a gate line auxiliary drive signal from the first transfer line onto the gate lines during the touch sensing period that mimics the touch drive signal. One or more auxiliary lines supply a supplemental auxiliary drive signal during the touch sensing period that mimics the touch drive signal.

12 Claims, 5 Drawing Sheets

DISPLAY DEVICE HAVING A TOUCH PANEL WITH AUXILIARY LINES SUPPLYING SUPPLEMENTAL AUXILIARY DRIVE SIGNALS

This application claims the benefit of Korean Patent Application No. 10-2014-0093989, filed on Jul. 24, 2014 which is hereby incorporated by reference as if fully set forth herein.

BACKGROUND OF THE INVENTION

1. Field of the Invention

The present invention relates to a display device having enhanced touch sensing ability.

2. Discussion of the Related Art

Recently, a touch panel has been used as an input unit of a flat panel display device in order to allow a user to directly input information, using a finger or a pen.

Structures of a touch panel built in a flat display device include on-cell type, in-cell type, and hybrid in-cell type structures. A display device using an in-cell type touch panel or a hybrid in-cell type touch panel is referred to as a "touch panel built-in display device". Methods for driving a touch panel include resistive and capacitive driving methods. The capacitive driving method is classified into a self cap driving method and a mutual driving method. In the case of a display device using the self cap driving method, a plurality of touch electrodes is formed on a display panel. A touch drive signal is applied to each touch electrode in order to determine whether or not touch is made.

In a conventional display device, which uses the above-mentioned self cap driving method, however, the touch electrode, to which a touch drive signal is input, is also used as a common electrode in an image display period. For this reason, the touch drive signal (square voltage waveform) applied to the touch electrode is influenced by noise generated in the display panel. Such noise may cause degradation of performance of the touch panel. Therefore, such noise should be eliminated.

SUMMARY OF THE INVENTION

In a first embodiment, a touch display device comprises a controller to generate a touch sync signal for controlling timing of a touch sensing period and a display period in each of a plurality of frames. The touch sensing period and the display period alternate with each other. A touch panel has a plurality of touch electrodes in a display area of the touch display device. The touch panel generates touch sensing signals indicating whether or not a touch occurs during the touch sensing period. A touch sensing circuit supplies a touch drive signal to the plurality of touch electrodes during the touch sensing period to detect if the touch occurred based on the touch sensing signals. A gate driver supplies gate pulses to gate lines of the touch panel during the display period to activate respective rows of pixels to receive pixel data. The gate driver supplies the gate pulses by switching between driving a first drive voltage from a first transfer line onto the gate lines and driving a second drive voltage from a second transfer line onto the gate lines. The gate driver further supplies a gate line auxiliary drive signal from the first transfer line onto the gate lines during the touch sensing period. The gate line auxiliary drive signal mimics the touch drive signal. One or more auxiliary lines supply a supplemental auxiliary drive signal during the touch sensing period. The one or more auxiliary lines are adjacent to the first transfer line. The supplemental auxiliary drive signal mimics the touch drive signal.

In a second embodiment, a method for operating a touch display device described above is provided.

In a third embodiment, a touch display device comprises a controller to generate a touch sync signal for controlling timing of a touch sensing period and a display period in each of a plurality of frames, where the touch sensing period and the display period alternate with each other. A touch panel has a plurality of touch electrodes in a display area of the touch display device. The touch panel generates touch sensing signals indicating whether or not a touch occurs during the touch sensing period. A touch sensing circuit supplies a touch drive signal to the plurality of touch electrodes during the touch sensing period and detects if the touch occurred based on the touch sensing signals. A first transfer line supplies a first DC drive voltage to the touch panel during the display period and supplies a first auxiliary drive signal during the touch sensing period. The first auxiliary drive signal mimics the touch drive signal. A second transfer line supplies a second DC drive voltage during the display period and during the touch sensing period. A first auxiliary line supplies a supplemental auxiliary drive signal mimicking the touch drive signal during the touch sensing period, where the first auxiliary line is disposed between the first transfer line and the second transfer line.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings.

DETAILED DESCRIPTION OF THE INVENTION

Reference will now be made in detail to the preferred embodiments of the present invention associated with a display device having a touch panel and a driving method thereof, examples of which are illustrated in the accompanying drawings.

In accordance with an embodiment, auxiliary drive signals may be applied to associated ones of the data lines and gate lines in a touch sensing period of a touch display device. Each auxiliary drive signal may be set to be synchronized with the touch drive signal applied to the sensing lines and as such, has the same oscillation period, output time point, and amplitude as the touch drive signal. Accordingly, it may be possible to completely remove noise components having influence on a touch drive signal due to the data lines and gate lines in the touch sensing period, thereby preventing delay of the touch drive signal and achieving an enhancement in touch sensing ability.

In addition, in accordance with an embodiment, the auxiliary lines may be formed at opposite sides of the gate-off voltage supply line, and an auxiliary drive signal may be applied to the auxiliary lines in the touch sensing period. Accordingly, the auxiliary drive signal applied to the gate-off voltage supply line in the touch sensing period may be subjected to reduced influence of a DC voltage applied to peripheral lines and, as such, delay of the auxiliary drive signal may be prevented. Thus, the delay-prevented auxiliary drive signal may more efficiently function to prevent delay of the touch drive signal. As a result, touch sensing ability may be further enhanced.

In a display device according to the present invention, a self cap type touch panel is built in a display panel. For descriptions of the basic configuration of the self cap type display device according to the present invention and a touch sensing method associated therewith, Korean Unexampled Patent Publication Nos. 10-2013-0129620, 10-201300132061 and 10-2013-0132197, and Korean Registered Patent No. 10-1330320 issued in the name of the present applicant are referred to. In the described self cap touch type touch panel, a touch sync signal from a controller controls timing of a touch sensing period and a display period in each of a plurality of frames with the touch sensing period and the display period alternating with each other.

Figure 1:
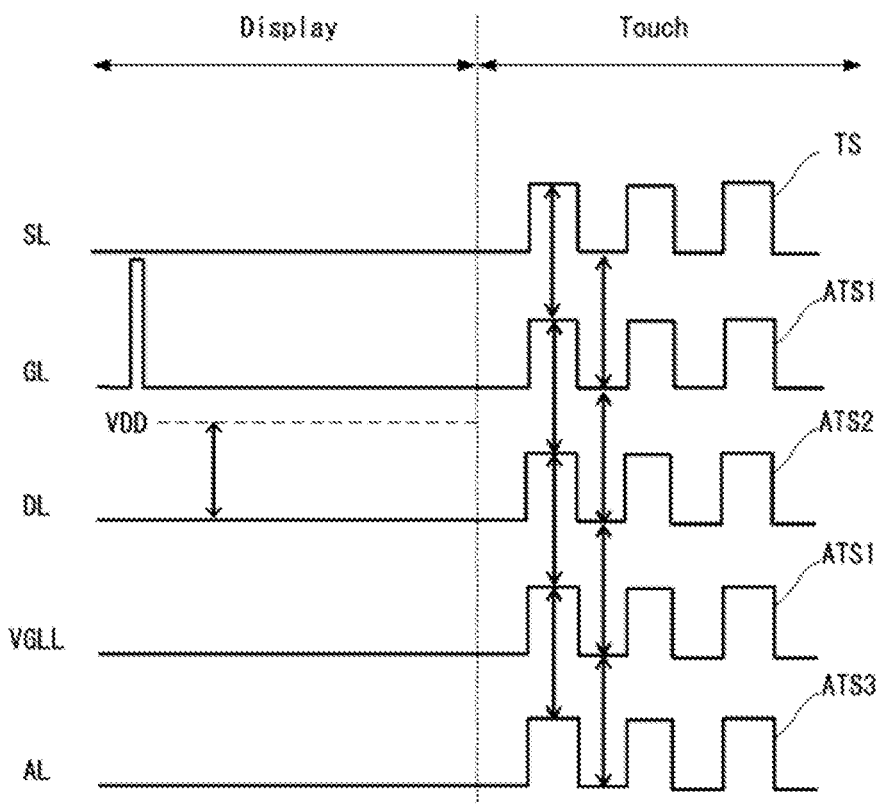
FIG. 1 is a waveform diagram illustrating driving of the display device according to the present invention.
Figure 2:
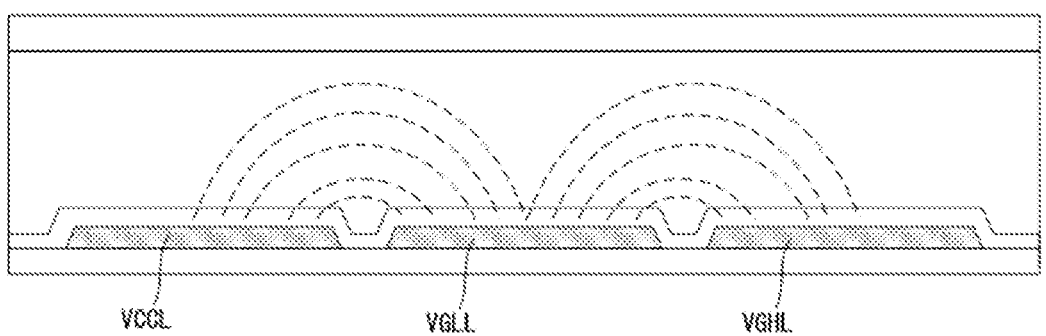
FIG. 2 is a sectional view explaining noise having influence on a touch drive signal in a non-display area.

FIG. 1 is a waveform diagram illustrating driving of the display device according to the present invention. FIG. 2 is a sectional view explaining noise having influence on a touch drive signal in a non-display area.

For reference, in self cap driving methods disclosed in the above publications, there may be a problem in that a touch drive signal TS for sensing of touch may be delayed under the influence of lines of a display panel, to which a DC voltage is applied. For example, when the touch drive signal TS for sensing of touch is applied to a sensing line SL in a touch sensing period, a data voltage, which has been finally applied in an image display period, is held in a data line DL around the sensing line SL in the form of a DC voltage, and a DC voltage such as a gate-off voltage VGL is held in a gate line GL. In this case, parasitic capacitance caused by a horizontal electric field is generated because the data line DL, gate line GL, and sensing line SL are arranged adjacent to one another. As a result, the DC voltages applied to the data line DL and gate line GL function as a load of the touch drive signal TS applied to the sensing line SL and, as such, the touch drive signal TS is delayed.

In accordance with the present invention, auxiliary drive signals ATS1 and ATS2 mimic the touch drive signal TS applied to the sensing line SL (e.g., have the same AC waveform as the touch drive signal TS including amplitude and phase). The auxiliary drive signals ATS1 and ATS2 are applied to the gate line GL and data line DL, respectively, in order to prevent the touch drive signal TS from being delayed under the influence of the DC voltages applied to the gate line GL and data line DL in the touch sensing period. As illustrated in FIG. 1, the auxiliary drive signals ATS1 (e.g., a gate line auxiliary drive signal) and ATS2 (e.g., a data line auxiliary drive signal) are synchronized with the touch drive signal TS applied to the sensing line SL and, as such, have the same oscillation period, output time point, and amplitude as the touch drive signal TS. Accordingly, in accordance with the present invention, it may be possible to completely remove noise components having influence on the touch drive signal TS due to the data line DL and gate line GL in the touch sensing period.

In order to apply the auxiliary drive signals ATS1 and ATS2 to the gate line GL and data line DL in the touch sensing period, as described above, it is necessary to additionally control driving circuits for driving the gate line GL and data line DL.

For example, a data driver generates a second auxiliary drive signal, namely, the auxiliary drive signal ATS2, in the touch sensing period under control of a timing controller, and supplies the second auxiliary drive signal ATS2 to data lines DL. Meanwhile, generally, a gate driver applies a gate pulse (or scan pulse) to gate lines GL by switching between driving a gate-on voltage VHL supplied from a gate-off voltage supply line during a pulse period and otherwise driving a gate-off voltage VGL supplied from a gate-off voltage supply line VGLL to the gate lines GL. In accordance with the present invention, a first auxiliary drive signal, namely, the auxiliary drive signal ATS1, is supplied from outside the gate driver to the gate-off voltage supply line VGLL in the touch sensing period, in place of the gate-off voltage VGL. In the touch sensing period, accordingly, the gate driver supplies the first auxiliary drive signal ATS1 supplied from the gate-off voltage supply line VGLL to the gate lines GL.

Meanwhile, transfer lines VCCL, VGLL, VGHL, and GNDL, to which a supply voltage VCC, a gate-off voltage VGL, a gate-on voltage VGH, a ground voltage GND, a plurality of clock signals, etc., are formed in a non-display area NA of the display panel. The transfer lines VCCL, VGLL, VGHL, and GNDL have a greater area than lines formed in a display area AA. Accordingly, the first auxiliary drive signal ATS1, which is applied to the gate-off voltage supply line VGLL, is further influenced by surrounding elements than the touch drive signal TS applied to the display area AA.

In accordance with the present invention, auxiliary lines AL are formed at opposite sides of the gate-off voltage supply line VGLL, and a third auxiliary drive signal ATS3 (e.g. a supplemental auxiliary drive signal) is applied to the auxiliary lines AL, in order to prevent the first auxiliary drive signal ATS1 applied to the gate-off voltage supply line VGLL from being delayed under the influence of the transfer lines VCCL, VGHL, and GNDL, to which DC voltages (the supply voltage VCC, gate-on voltage VGH, and ground voltage GND) are applied in the touch sensing period. The third auxiliary drive signal ATS3 mimics (e.g., is synchronized with) the touch drive signal and, as such, is set to have, for example, the same oscillation period, output time point (e.g., phase), and amplitude as the touch drive signal TS. Accordingly, it may be possible to reduce noise components, which are generated due to surrounding elements and have influence on the first auxiliary drive signal ATS1 applied to the gate-off voltage supply line VGLL in the touch sensing period.

Hereinafter, the display device according to the present invention will be described in more detail. The display device of the present invention may be implemented in the form of a flat display device such as a liquid crystal display (LCD), a field emission display (FED), a plasma display panel (PDP), an organic light emitting display (OLED), and an electrophoretic display (EPD). In the following embodiments, the display device of the present invention will be described mainly in conjunction with an LCD as an example of the flat display device. However, it should be noted that the display device of the present invention is not limited to the LCD.

Figure 3:
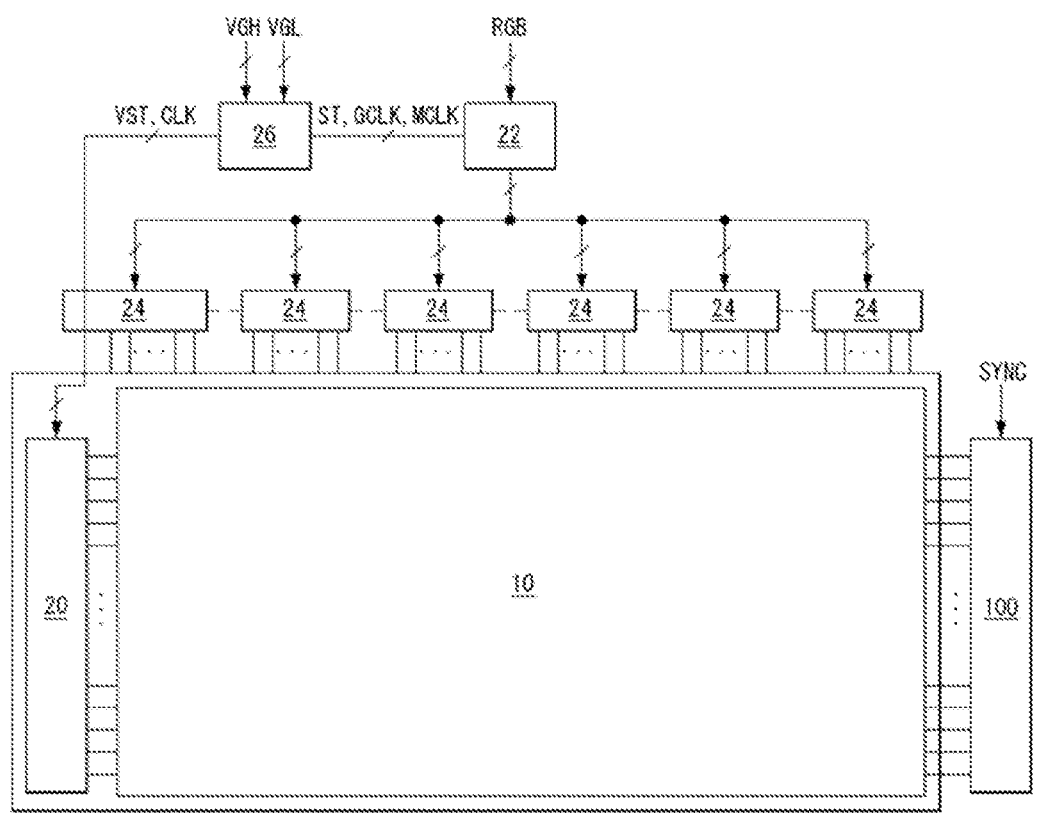
FIG. 3 is a block diagram illustrating a display device according to an embodiment of the present invention.
Figure 4:
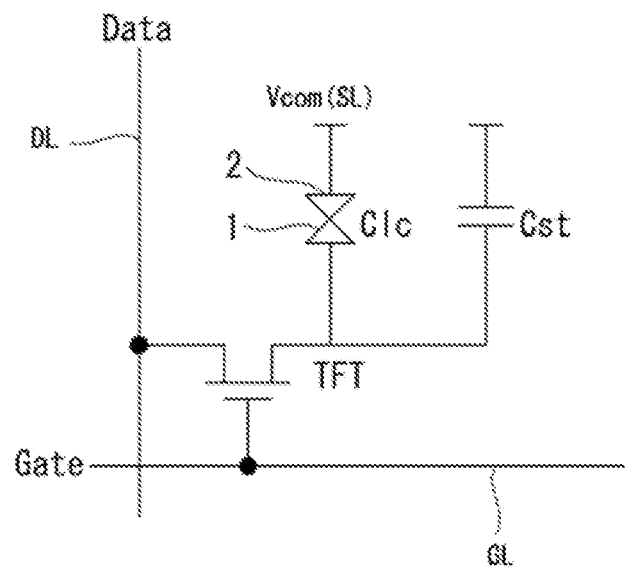
FIG. 4 is an equivalent circuit diagram of a liquid crystal cell.
Figure 5:
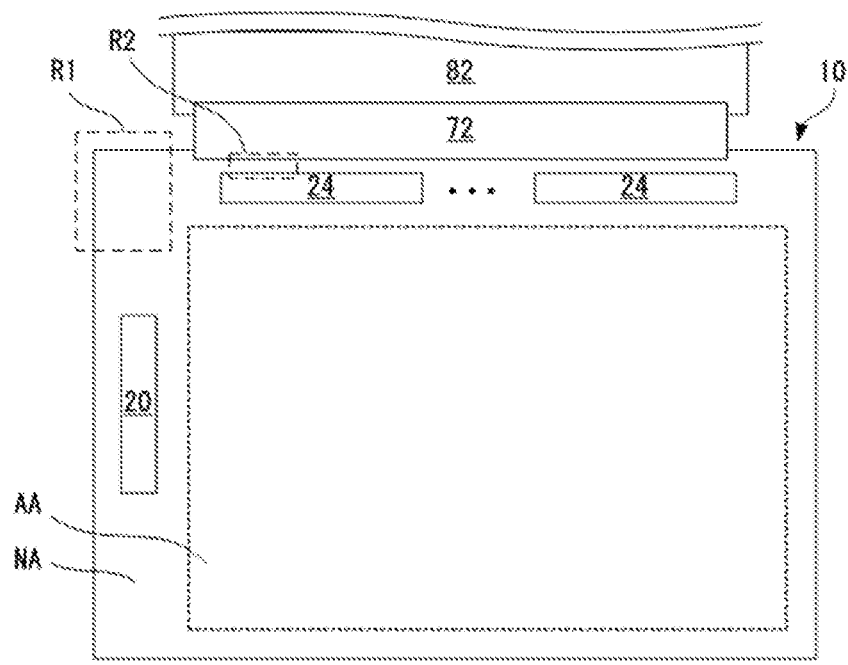
FIG. 5 is a block diagram illustrating the display device of FIG. 3.
Figure 6:
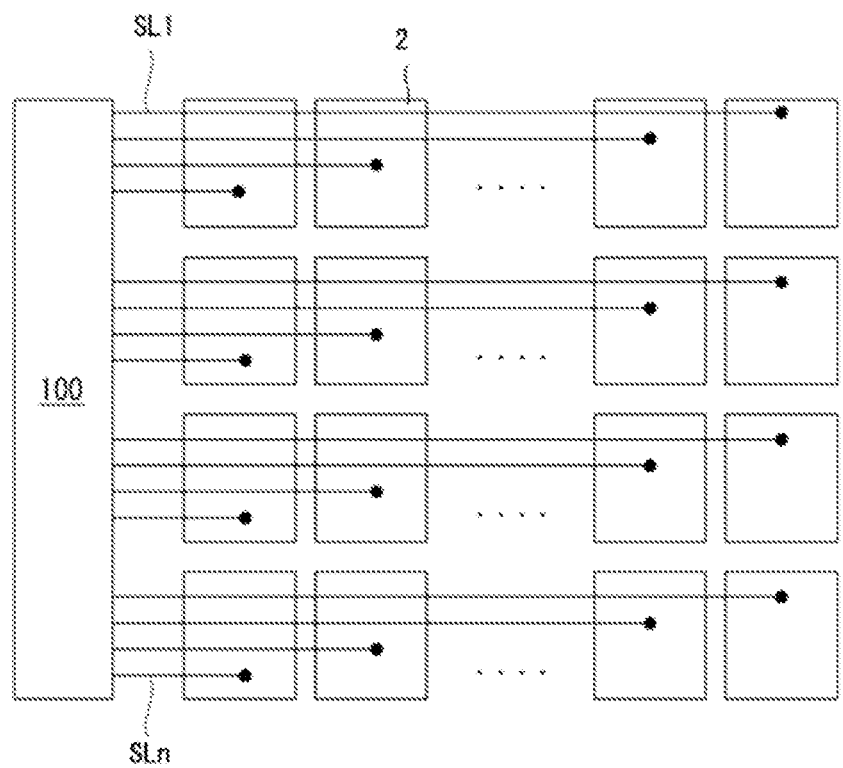
FIG. 6 is a block diagram illustrating structures of touch electrodes and touch sensing lines built in a display panel.

FIG. 3 is a block diagram illustrating a display device according to an embodiment of the present invention. FIG. 4 is an equivalent circuit diagram of a liquid crystal cell. FIG. 5 is a block diagram illustrating the display device of FIG. 3. FIG. 6 is a block diagram illustrating structures of touch electrodes 2 and touch sensing lines SL1 to SLn built in a display panel 10.

Referring to FIGS. 3 and 4, the display device of the present invention includes the display panel 10, in which a touch panel is built, a panel driving circuit for enabling the display panel 10 to display an image, and a touch sensing circuit 100 for recognizing touch. The panel driving circuit includes data drivers 24 for driving corresponding data lines of the display panel 10, a gate driver 20 for driving gate lines 12 of the display panel 10, a timing controller 22 for controlling the data drivers 24 and gate driver 20, a power supply circuit, etc.

As illustrated in FIG. 5, the data drivers 24 are directly mounted in an IC form in a non-display area disposed at one side of the display panel 10, whereas the gate driver 20 is directly mounted in an IC form in a non-display area disposed at another side of the display panel 10. The touch sensing circuit 100, timing controller 22, and power supply circuit are mounted on a printed circuit board (PCB) 82. The PCB 82 is connected to the display panel 10 via a flexible PCB (FPCB) 72. The display device illustrated in FIG. 5 is only an example for embodying the display device of FIG. 3. Accordingly, the present invention is not limited to the structure of the display panel illustrated in FIG. 5.

The display panel 10 may include a liquid crystal layer formed between two substrates. The substrates may be glass substrates, plastic substrates, film substrates, or the like.

A black matrix, color filters, etc. are formed on an upper one of the substrates of the display panel 10. Polarization films are attached to the upper and lower substrates of the display panel 10, respectively. Alignment films are formed at inner surfaces of the upper and lower substrates contacting liquid crystals, to set a pre-tilt angle of the liquid crystals. Spacers are formed between the upper and lower substrates of the display panel 10, to maintain a cell gap between liquid crystal cells.

A pixel array, which is formed at the lower substrate of the display panel 10, includes data lines DL, gate lines GL intersecting the data lines DL, and pixels arranged in a matrix. The pixel array further includes a plurality of thin film transistors (TFTs) respectively formed at intersections between the data lines DL and the gate lines GL, pixel electrodes 1 connected to respective TFTs, and storage capacitors each connected to a corresponding one of the pixel electrodes 1, to maintain a pixel voltage. The pixels of the display panel 10 are arranged in a matrix defined by the data lines DL and gate lines GL. The liquid crystal cell of each pixel is driven by an electric field applied thereto in accordance with a difference between a data voltage applied to the corresponding pixel electrode 1 and a common voltage applied to a common electrode 2 and, as such, adjusts transmittance of incident light. In an image display period, each TFT is turned on in response to a gate pulse (scan pulse) supplied from a corresponding one of the gate lines GL and, as such, supplies a voltage from a corresponding one of the data lines DL to the corresponding pixel electrode 1. The gate pulses activate respective rows of pixels to receive pixel data. In a touch sensing period, auxiliary drive signals ATS1 and ATS2 are applied to the gate lines GL and data lines DL, as illustrated in FIG. 1 and, as such, driving of the pixels is held.

The common electrode 2 of the display panel 10 also functions as a touch electrode. That is, the common electrode 2 not only functions to drive the corresponding liquid crystal cell in the image display period by receiving a common voltage, but also functions to sense touch in the touch sensing period by receiving the touch drive signal TS. In this regard, in the following description, the common electrode 2 means a "touch electrode" and, as such, will be used together with the touch electrode 2, for convenience of description.

Referring to FIG. 6, the touch electrodes 2 are formed at the lower substrate. In detail, the touch electrodes 2 are arranged on a layer other than a layer, on which the pixel electrodes 1 are arranged, under the condition that the touch electrodes 2 overlap with the pixel electrodes 1. The area of each touch electrode 2 may be greater than the area of each pixel. The touch electrodes 2 are connected to the sensing lines SL1 to SLn in such a manner that the touch electrodes 2 correspond one to one to the sensing lines SL1 to SLn and, as such, are connected to the touch sensing circuit 100. The common voltage is applied to the touch electrodes 2 in the image display period, whereas the touch drive signal TS is applied to the touch electrodes 2 in the touch sensing period.

Figure 7:
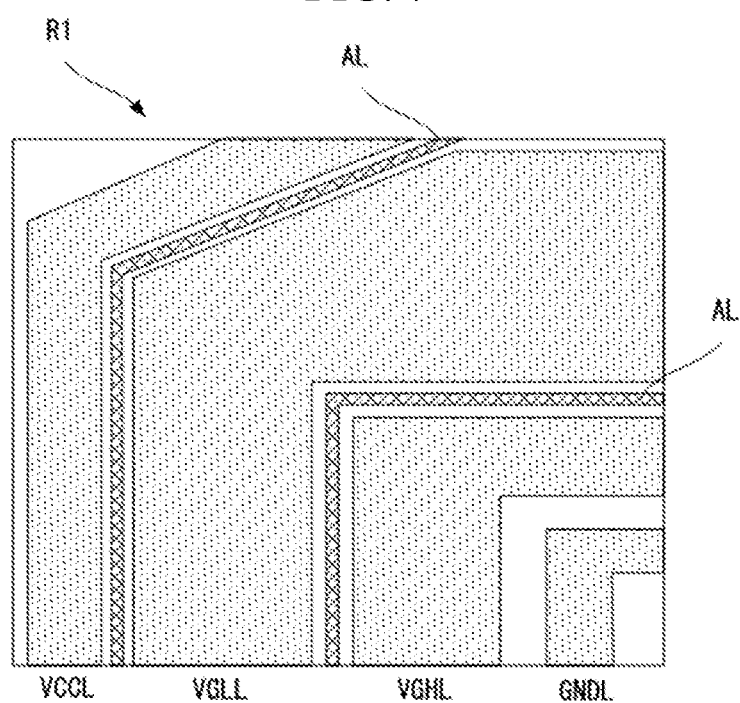
FIG. 7 is an enlarged plan view of an area R1 illustrated in FIG. 5.
Figure 8:
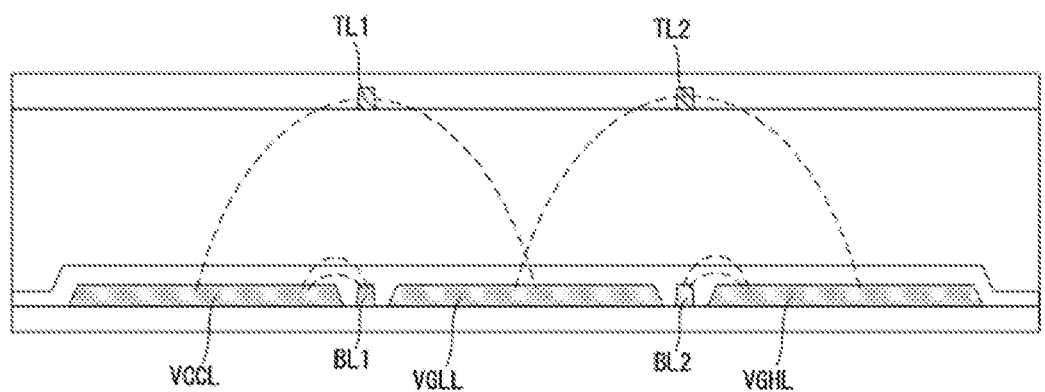
FIG. 8 is a sectional view of the area R1 illustrated in FIG. 5.

FIG. 7 is an enlarged plan view of an area R1 illustrated in FIG. 5. FIG. 8 is a sectional view of the area R1 illustrated in FIG. 5.

The display panel 10 of the present invention is formed, at the non-display area thereof, with a plurality of transfer lines for transferring a plurality of drive voltages and a plurality of signals, which are supplied from the FPCB 72.

Referring to FIG. 4, the transfer lines, which are adapted to transfer a plurality of drive voltages and a plurality of control signals supplied from the FPCB 72, are formed in the non-display area of the display panel 10 in a line-on-glass (LOG) type. The LOG type transfer lines may transfer a supply voltage VCC, a gate-off voltage VGL, a gate-on voltage VGH, a ground voltage GND, a plurality of clock signals, etc.

The LOG type transfer lines may be divided into two groups, namely, a first group of transfer lines VCCL, VGHL, and GNDL, to which DC voltages such as the supply voltage VCC, gate-on voltage VGH, and ground voltage GND are applied in the touch sensing period, respectively, and a second group of transfer lines VGLL, to which the first auxiliary drive signal ATS1 is applied in the touch sensing period.

Auxiliary lines AL are formed between adjacent ones of the transfer lines of the first group and the transfer lines of the second group. A third auxiliary drive signal ATS3 is applied to the auxiliary lines AL. The auxiliary lines AL may be formed at opposite sides of each transfer line of the second group. In this case, the first auxiliary drive signal ATS1 applied to the transfer lines of the second group may be subjected to reduced influence of the surrounding elements and, as such, an enhancement in reliability may be achieved.

The transfer line(s) of the second group may include a gate-off voltage supply line VGLL. In this case, the auxiliary lines AL are formed at opposite sides of the gate-off voltage supply line VGLL and are disposed in between the transfer line(s) of the second group (e.g., the gate-off voltage supply line VGLL) and transfer lines of the first group. For example, as illustrated in FIG. 7, a first auxiliary line AL is adjacent to and on a first side of the gate-off voltage supply line VGLL and a second auxiliary transfer line is adjacent to and on a second side of gate-off voltage supply line VGLL. The supply voltage VCC is adjacent to the first auxiliary line on an opposite side of the first auxiliary line from the gate-off voltage supply line VGLL. The gate-on voltage supply line VGHL is adjacent to the second auxiliary line on an opposite side of the second auxiliary line from the gate-off voltage supply line VGLL. The third auxiliary drive signal ATS3 is applied to the auxiliary lines AL in the touch sensing period. The third auxiliary drive signal ATS3 applied to the auxiliary lines AL is supplied from an external power supply circuit, for example, a level shifter 26.

The auxiliary lines AL reduce influence of the surrounding elements on the second auxiliary drive signal ATS2 applied to the transfer lines of the second group in the touch sensing period and, as such, prevent the first auxiliary drive signal ATS1 from being delayed.

The auxiliary lines AL may take the form of a single layer forming the same layer as one of the gate lines GL, data lines DL, touch electrodes 2, and pixel electrodes 1. Alternatively, the auxiliary lines AL may take the form of a multilayer in order to further protect the auxiliary drive signals ATS applied to the transfer lines of the second group. That is, the auxiliary lines AL may be constituted by multilayer lines formed in the same layer as at least one of the gate lines GL, data lines DL, touch electrodes 2, and pixel electrodes 1. For example, as illustrated in FIG. 8 each auxiliary line AL may include a corresponding one of upper lines TL1 and TL2 formed in the same layer as the touch electrodes 2, and a corresponding one of lower lines BL1 and BL2 formed in the same layer as the gate lines GL. Referring to FIG. 8, it may be seen that, when auxiliary lines AL are formed at opposite sides of the gate-off voltage supply line VGLL, to which the auxiliary drive signal ATS is applied in the touch sensing period, parasitic capacitance having influence on the gate-off voltage supply line VGLL is reduced.

Meanwhile, the area R2 illustrated in FIG. 5 is an area between the FPCB 72 and the data driver 24. At the display panel 10, a plurality of link lines (not shown) is formed to connect pads contacting the FPCB 72 to the data driver 24, respectively. When there are link lines to transfer the auxiliary drive signals ATS to the data driver 24 in the touch sensing period, like the transfer lines of the second group, auxiliary lines AL to which an auxiliary drive signal ATS is applied in the touch sensing period are formed at opposite sides of each link line.

The panel driving circuit and the touch sensing circuit 100 will be further described with reference to FIGS. 3 and 4. The panel driving circuit includes the data drivers 24 for driving corresponding data lines of the display panel 10, the gate driver 20 for driving the gate lines 12 of the display panel 10, the timing controller 22 for controlling the data drivers 24 and gate driver 20, the power supply circuit, etc.

Each data driver 24 generates a data voltage in the image display period by converting digital video data RGB input from the timing controller 22 into an analog positive/negative gamma compensation voltage. The data driver 24 supplies the data voltage to the corresponding data lines 11 under control of the timing controller 22, and inverts the polarity of the data voltage. In the touch sensing period, the data driver 24 generates the second auxiliary drive signal ATS2 under control of the timing controller 22, and supplies the second auxiliary drive signal ATS2 to the corresponding data lines DL.

In the image display period, the gate driver 20 sequentially supplies a gate pulse (or scan pulse) synchronized with the data voltage to the gate lines and, as such, sequentially selects the data lines of the display panel 10. In accordance with development of technologies associated with a gate in panel (GIP) process, the gate driver 20 may be built in the non-display area of the display panel 10. In the touch sensing period, the gate driver 20 supplies, to the gate lines GL, the first auxiliary drive signal ATS1 supplied from the transfer line VGLL of the second group.

The level shifter 26, which is included in the power supply circuit, outputs clock signals CLK and a start pulse VST swung between the gate-on voltage VGH and the gate-off voltage VGL under control of the timing controller 22. The gate-on voltage VGH is set to a voltage equal to or higher than the threshold voltage of the TFTs formed at the pixel array of the display panel. The gate-off voltage VGL is set to a voltage lower than the threshold voltage of the TFTs formed at the pixel array of the display panel 10. In response to a start pulse ST, a first clock GCLK, and a second clock MCLK, the level shifter 26 outputs clock signals CLK and a start pulse VST swung between the gate-on voltage VGH and the gate-off voltage VGL under control of the timing controller 22. The clock signals CLK output from the level shifter 26 are sequentially phase-shifted, and then transferred to the gate driver 20 formed on the display panel 10. The level shifter 26 generates the first and third auxiliary drive signals ATS1 and ATS3 in the touch sensing period. The level shifter 26 supplies the first auxiliary drive signal ATS1 to the transfer line VGLL of the second group, and supplies the third auxiliary drive signal ATS3 to the auxiliary lines AL.

The timing controller 22 supplies digital video data received from an external host system to the data drivers 24. The timing controller 22 receives timing signals such as a vertical synchronization signal Vsync, a horizontal synchronization signal Hsync, a data enable signal DE, and clocks from the external host system, and outputs timing control signals for controlling operation timing of the data drivers 24, gate driver 20, and power supply circuit. The timing controller 22 outputs a touch synchronization signal SYNC for controlling operation timing of the touch sensing circuit 100 For example, the touch synchronization signal controls timing of the touch sensing period and the display period in each of a plurality of frames with the touch sensing period and the display period alternating with each other.

The touch sensing circuit 100 applies the touch drive signal TS to the sensing lines SL1 to SLn connected to the touch electrodes 2, and counts voltage variation of the touch drive signal TS generated before and after touch or a rising or falling edge delay time of the touch drive signal TS and, as such, senses capacitance variation generated before and after input of touch (or proximity). The touch sensing circuit 100 converts a voltage received from each touch electrode 2 into digital data (e.g., a touch sensing signal), thereby generating raw touch data. Thereafter, the touch sensing circuit 100 analyzes the raw touch data through execution of a predetermined touch recognition algorithm, thereby detecting a touch (proximity) input. The touch sensing circuit 100 transfers touch report data including coordinates of a touch (proximity) input position to the timing controller 22 or host system.

As apparent from the above description, in accordance with the present invention, auxiliary drive signals are applied to associated ones of the data lines and gate lines in a touch sensing period. Each auxiliary drive signal is set to be synchronized with the touch drive signal applied to the sensing lines and as such, has the same oscillation period, output time point, and amplitude as the touch drive signal. Accordingly, it may be possible to completely remove noise components having influence on a touch drive signal TS due to the data lines and gate lines in the touch sensing period, thereby preventing delay of the touch drive signal and achieving an enhancement in touch sensing ability.

In addition, in accordance with the present invention, auxiliary lines are formed at opposite sides of a gate-off voltage supply line, and an auxiliary drive signal is applied to the auxiliary lines in the touch sensing period. Accordingly, the auxiliary drive signal applied to the gate-off voltage supply line in the touch sensing period is subjected to reduced influence of a DC voltage applied to peripheral lines and, as such, delay of the auxiliary drive signal is prevented. Thus, the delay-prevented auxiliary drive signal more efficiently functions to prevent delay of the touch drive signal. As a result, touch sensing ability is further enhanced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A touch display device, comprising:
   a controller to generate a touch sync signal for controlling timing of a touch sensing period and a display period in each of a plurality of frames, the touch sensing period and the display period alternating with each other;
   a touch panel having a plurality of touch electrodes in a display area of the touch display device, the touch panel to generate touch sensing signals indicating whether or not a touch occurs during the touch sensing period;
   a touch sensing circuit to supply a touch drive signal to the plurality of touch electrodes during the touch sensing period and to detect if the touch occurred based on the touch sensing signals;
   a gate driver to supply gate pulses to gate lines of the touch panel during the display period to activate respective rows of pixels to receive pixel data, the gate driver to supply the gate pulses by switching between driving a gate-off voltage from a gate-off voltage supply line onto the gate lines and driving a gate-on voltage from a gate-on voltage supply line onto the gate lines, the gate driver further to supply a gate line auxiliary drive signal from the gate-off voltage supply line onto the gate lines during the touch sensing period, the gate line auxiliary drive signal mimicking the touch drive signal;
   a first auxiliary line adjacent to the gate-off voltage supply line on a first side of the gate-off voltage supply line and a second auxiliary line adjacent to the gate-off voltage supply line on a second side of the gate-off voltage supply line opposite the first side, the first and second auxiliary lines formed at least in part on a same layer as the gate-off voltage supply line, the first and second auxiliary lines to supply a supplemental auxiliary drive signal during the touch sensing period, the supplemental auxiliary drive signal mimicking the touch drive signal.

2. The touch display device of claim 1, wherein the gate-on voltage supply line supplies the gate-on voltage during the touch sensing period.

3. The touch display device of claim 1, wherein the gate line auxiliary drive signal and the supplemental auxiliary drive signal each have an approximately same signal level and approximately same phase as the touch drive signal during the touch sensing period.

4. The touch display device of claim 1, further comprising:
   a data driver to provide data voltages representing pixel data to data lines of the touch panel during the display period and to supply a data line auxiliary drive signal onto the data lines during the touch sensing period, the data line auxiliary drive signal mimicking the touch drive signal.

5. The touch display device of claim 1, wherein the gate-on voltage supply line is adjacent to at least one of the first and second auxiliary lines.

6. The touch display device of claim 1, the touch display device further comprising:
   a transfer line adjacent to the first auxiliary line on an opposite side of the first auxiliary line from the gate-off voltage supply line, the transfer line supplying a DC supply voltage to the touch display device during the display period and the touch sensing period; and
   wherein the gate-on voltage supply line is adjacent to the second auxiliary line on an opposite side of the second auxiliary line from the gate-off voltage supply line.

7. The touch display device of claim 1, wherein the first and second auxiliary lines comprise first and second multilayer lines respectively having an upper line and a lower line on different layers of the touch panel.

8. The touch display device of claim 7, wherein the upper line is on a same layer as the touch electrodes and wherein the lower line is on a same layer as the gate lines.

9. A method for operating a touch display device, the method comprising:
   generating, by a controller, a touch sync signal for controlling timing of a touch sensing period and a display period in each of a plurality of frames, the touch sensing period and the display period alternating with each other;
   supplying, by a touch sensing circuit, a touch drive signal to a plurality of touch electrodes in a display area of a touch panel during the touch sensing period;
   supplying, by a gate driver during the display period, gate pulses to gate lines of the touch panel to activate respective rows of pixels to receive pixel data, the gate driver supplying the gate pulses by switching between driving a gate-off voltage from a gate-off voltage supply line onto the gate lines and driving a gate-on voltage from a gate-on voltage supply line onto the gate lines;
   supplying, by the gate driver during the touch sensing period, a gate line auxiliary drive signal from the gate-off voltage supply line onto the gate lines, the gate line auxiliary drive signal mimicking the touch drive signal;
   providing during the touch sensing period, a supplemental auxiliary drive signal mimicking the touch drive signal on a first auxiliary line adjacent to the gate-off voltage supply line of a first side of the gate-off voltage supply line and on a second auxiliary line adjacent to the gate-off voltage supply line on a second side of the gate-off voltage supply line opposite the first side, the first and second auxiliary lines formed at least in part on a same layer as the gate-off voltage supply line;
   generating, by the touch panel, touch sensing signals indicating whether or not a touch occurred during the touch sensing period; and
   detecting, by the touch sensing circuit, if the touch occurred during the touch sensing period based on the touch sensing signals.

10. The method of claim 9, further comprising:
    supplying the gate-on voltage on the gate-on voltage supply line during the touch sensing period.

11. The method of claim 9, further comprising:
    supplying by a data driver during the touch sensing period, a data line auxiliary drive signal onto the data lines, the data line auxiliary drive signal mimicking the touch drive signal.

12. The method of claim 9, wherein the first and second auxiliary lines respectively comprise first and second multilayer lines each having an upper line and a lower line on different layers of the touch panel, and wherein providing the supplemental auxiliary drive signal comprises:

provic the supplemental auxiliary drive signal on the first and second multilayer lines.

\* \* \* \* \*